United States Patent [19]

Moser

[11] Patent Number: 4,518,303

[45] Date of Patent: May 21, 1985

[54] MOVABLE FLOOR SELF-UNLOADING TRAILER

[75] Inventor: William H. Moser, Paris, Tex.

[73] Assignees: Jerel J. Barham, Paris; Lynaveta Clegg, Roanoke, both of Tex.; part interest to each

[21] Appl. No.: 482,423

[22] Filed: Apr. 6, 1983

[51] Int. Cl.³ .............................................. B60P 1/38
[52] U.S. Cl. .................................... 414/528; 198/750; 198/841
[58] Field of Search ...................... 414/527, 528, 679; 198/750, 841, 853

[56] References Cited

U.S. PATENT DOCUMENTS

| | | |
|---|---|---|
| 1,717,843 | 6/1929 | Hollnagel . |
| 1,945,532 | 2/1934 | Lima ................................. 414/528 |
| 2,679,941 | 6/1954 | Roesies ............................. 414/527 |
| 2,916,169 | 12/1959 | De Witt ........................... 414/528 |
| 3,311,222 | 3/1967 | Crawford et al. . |
| 3,482,717 | 12/1969 | Moser . |
| 3,621,986 | 11/1971 | Webb et al. . |
| 3,669,247 | 6/1972 | Pulver . |
| 3,731,825 | 5/1973 | Holland et al. . |
| 3,876,089 | 4/1975 | Moser . |
| 3,913,760 | 10/1975 | Koral ............................... 414/528 |

Primary Examiner—Robert G. Sheridan
Attorney, Agent, or Firm—Hubbard, Thurman, Turner & Tucker

[57] ABSTRACT

A movable floor self-unloading trailer has a frame with rotatable sprocket shafts supported at each end and engaged with an endless conveyor type floor comprising a series of side-by-side floor plates which are interconnected by hinge pins and are each provided with a plurality of laterally spaced bearing shoes which slide in elongated longitudinally extending channel shaped bearing rails. The movable floor includes a drive sprocket assembly characterized by a series of sprocket segments which are configured to engage the floor plates along the bearing hinge portions. The movable floor is particularly adapted for use in conjunction with a modified general cargo type truck trailer which is adapted to handle containerized as well as bulk material loads.

3 Claims, 8 Drawing Figures

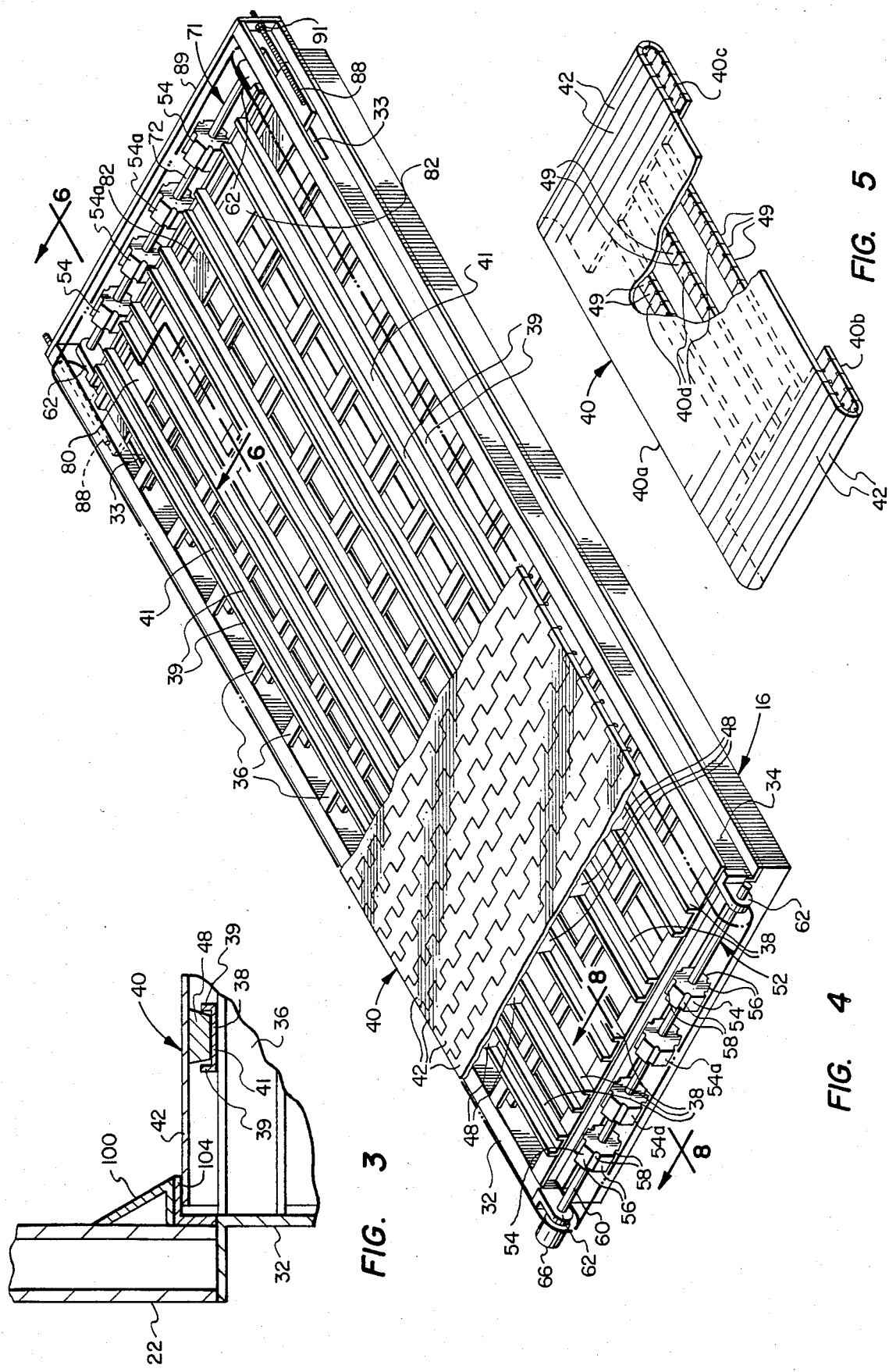

MOVABLE FLOOR SELF-UNLOADING TRAILER

BACKGROUND OF THE INVENTION

1. Field of the Invention

The present invention pertains to a self-unloading truck trailer having a movable floor made up of segmented floor plates which are interconnected by hinge pins and are trained over drive and idler sprockets at opposite ends of the trailer body.

2. Background

In the art of self-unloading cargo handling trailers and truck bodies there have been several developments in an effort to provide a reliable and mechanically uncomplicated mechanism which is adapted to load and unload general cargo as well as bulk materials.

My U.S. Pat. Nos. 3,482,717 and 3,876,089 disclose and claim various improvements in continuous endless conveyor type floors for load hauling trailers and vehicle beds. However, it has been determined in the development of a self-unloading trailer which is suitable for loading, supporting and unloading various types of general cargo and bulk materials such as wood chips, gravel and other flowable materials that certain improvements are desired. As described in my earlier patent, a continuous belt type conveyor floor is desirable to minimize leakage when hauling bulk materials. However, a continuous flexible belt type member requires a substantial support floor for the load bearing portion of the belt, and the friction created between the belt and the floor is substantial. Moreover, when hauling bulk materials such as sand or gravel, inevitably a certain amount of material will become lodged between the conveyor belt and the support floor which can have damaging results to the bearing surfaces of the belt and the floor.

In my more recent patent (U.S. Pat. No. 3,876,089), the disadvantages of the earlier floor design were overcome somewhat with an endless conveyor made up of a series of overlapping slats which were provided with lugs interconnected by a continuous flexible cable and adapted to mesh with a drive sprocket and an idler sprocket disposed at opposite ends of the trailer body. The bearing friction problem of the earlier design was alleviated to some extent by the provision of a plurality of spaced apart elongated beams running lengthwise of the trailer bed and supporting the floor slats directly thereon. Although the self-unloading trailer disclosed in U.S. Pat. No. 3,876,089 was developed for handling bulk materials there were still problems associated with leakage of the material along the longitudinal edges of the moving floor and excessive bearing friction was still generated between the floor slats and the bearing rails.

Other configurations of movable endless conveyor type floors for haulage vehicles have included endless chains to which the floor slats are attached, which chains are trained over drive and idler sprockets similar to the sprockets described in my U.S. Pat. No. 3,876,089.

Several problems have remained in regard to the provision of a suitable self-unloading floor which may be adapted to general cargo type truck beds or trailers as well as for beds which are particularly adapted for hauling bulk materials. There is a further need to reduce the bearing friction between the movable floor and the floor bearing supports. The relatively heavy loads which must be endured by the floor and the bearing supports has created a rather vexatious problem in developing a suitable floor design. The endless chain or lug and cable type conveyor mechanisms are relatively expensive and subject to troublesome breakdowns. Moreover, there has been a need to adapt the continuous conveyor self-unloading floor to general cargo type trailers which may be used for hauling pallet or containerized cargo as well as bulk materials. It is to the abovementioned problems that the present invention addresses itself and provides solutions thereto resulting in improvements in self-unloading floors for transport vehicle beds and trailer units.

SUMMARY OF THE INVENTION

The present invention provides an improved conveyor type self-unloading floor for transport vehicle beds and trailers. In accordance with one aspect of the present invention there is provided an improved self-unloading floor adapted for use with a general cargo box type trailer or bed for an over-the-highway type truck which is adapted for use with pallet or containerized cargo and also for loading, hauling and unloading various bulk materials. The self-unloading floor may be readily adapted to specialized cargo boxes such as sand or gravel beds and other boxes particularly adapted for hauling various types of bulk granular materials.

In accordance with another aspect of the present invention there is provided an endless conveyor type self-unloading trailer floor made up of a series of interconnected plates which are hinged to each other and which are provided with integral hinge portions which are adapted to be meshed with a drive sprocket at one end of the cargo box and trained over an idler sprocket at the opposite end of the cargo box.

In accordance with still another aspect of the present invention the interconnected conveyor plates also include spaced apart shoes forming bearing surfaces for supporting the floor for traversal along longitudinal bearing rails forming a part of the trailer or cargo bed frame.

In accordance with a further aspect of the present invention the interconnected hinged floor plates form a substantially flat planar floor surface which is relatively leakproof for hauling bulk materials and which also provides a surface suitable for use in conjunction with loading, and unloading containerized or palletized cargo as well as loose items supported on the movable floor. The improved endless conveyor structure eliminates the need for expensive endless chains or lug and cable arrangements and provides suitable bearing support for the load supporting floor portion with minimal bearing friction encountered during the loading and unloading process.

The improved drive sprocket and conveyor structure also provides for positively driving the conveyor floor directly without the need for separate and expensive drive chain structure. The interconnected full width floor plates extend around the drive sprockets and along the idle run of the conveyor only a sufficient length required for loading and unloading operations.

Although the present invention is directed to improvements in movable floors for general cargo beds or trailers, the basic floor and supporting frame structure associated therewith are also readily adapted to specialized bulk material hauling beds and trailers.

Those skilled in the art will recognize the abovementioned features and advantages of the present invention as well as other superior aspects thereof upon reading the detailed description which follows in conjunction with the drawings.

BRIEF DESCRIPTION OF THE DRAWINGS

FIG. 3 is a detail section view on a larger scale showing the antileakage coaming for the floor edge;

FIG. 4 is a perspective view of the movable floor and supporting frame structure;

FIG. 5 is a diagram illustrating the longitudinal extent of the full width floor plates;

DESCRIPTION OF THE PREFERRED EMBODIMENT

Figure 1:
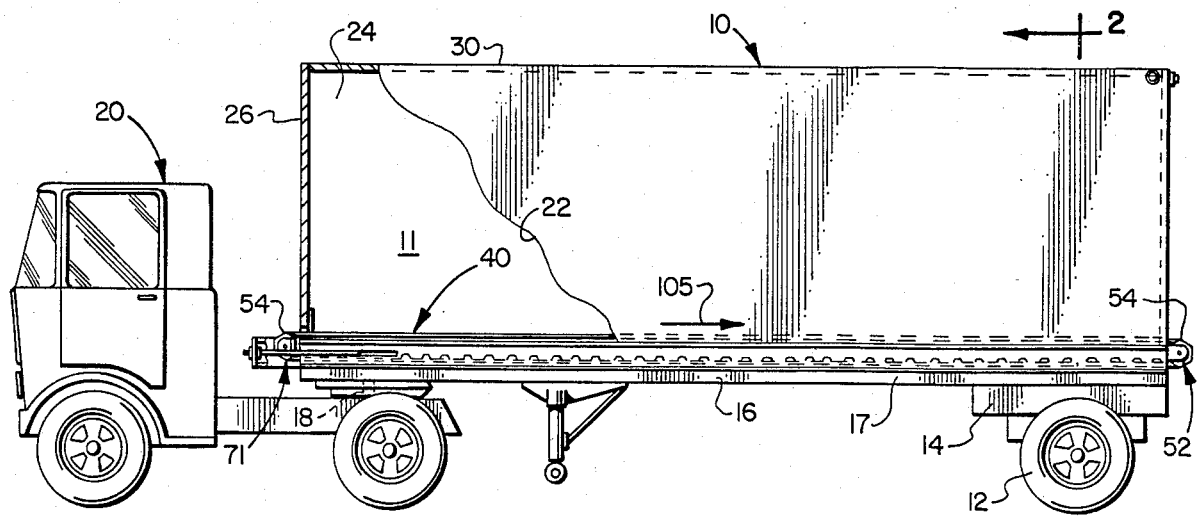
FIG. 1 is a side elevation of a general cargo type semitrailer including the improved movable floor of the present invention.

In the description which follows like parts are marked throughout the specification and drawings with the same reference numerals, respectively. The drawings are not necessarily to scale and certain features of the invention may be shown exaggerated in scale or in schematic form in the interest of clarity and conciseness.

Figure 2:
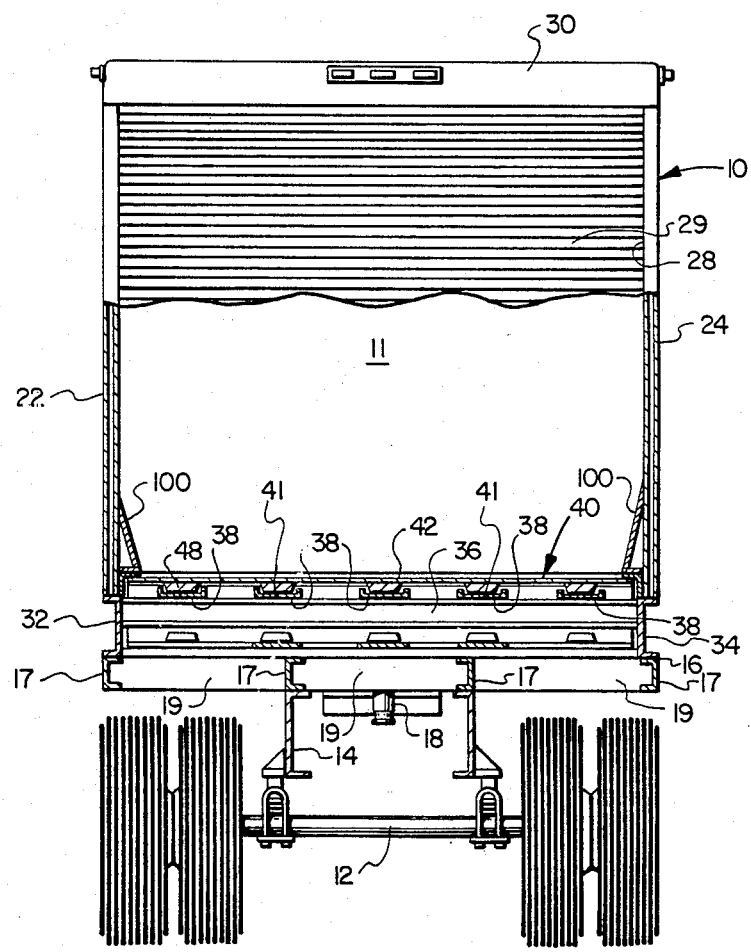
FIG. 2 is a section view taken substantially along the line 2—2 of FIG. 1.

Referring to FIGS. 1 and 2, there is illustrated an over-the-road cargo semitrailer, generally designated by the numeral 10, which includes an improved movable floor for use in loading and unloading the trailer when carrying general or palletized cargo as well as for carrying bulk material. The trailer 10 includes an undercarriage comprising at least one dual wheel axle assembly 12 including a subframe 14 which supports one end of an elongated frame assembly 16. The opposite end of the frame 16 includes a conventional kingpin 18 for connecting the trailer to a truck tractor 20, FIG. 1.

The trailer 10 includes a cargo bay 11 defined in part by spaced apart longitudinal sidewalls 22 and 24, a fixed front end wall 26 and a rear opening 28 which may be closed by a flexible sliding door 29 or conventional hinged rear doors, not shown. The trailer 10 may also include a fixed roof 30 or, alternatively, be supplied with a removable roof supported by spaced apart battens, not shown. The frame 16 comprises a generally rectangular boxlike structure preferably made up of conventional steel or aluminum structural members such as elongated channel sections 17 secured together by transverse channel sections 19 in a conventional manner. The frame 16 is also characterized by two spaced apart longitudinal channel members 32 and 34, FIGS. 2 and 4, which extend substantially the entire length of the frame and are interconnected by spaced apart transverse beam members 36. Additional longitudinal stringers or channels may also be provided extending parallel to and between the channel members 32 and 34. The transverse members 36 are adapted to support a plurality of longitudinally extending bearing rails 38 for supporting bearing pads or shoes of a movable endless conveyor type floor, generally designated by the numeral 40. The bearing rails 38 are characterized as elongated steel or aluminum upwardly facing channel members having opposed flanges 39 and a connecting web 41. The rails 38 extend parallel to each other and to the channel members 32 and 34 over substantially the entire length of the frame 16.

Figure 7:
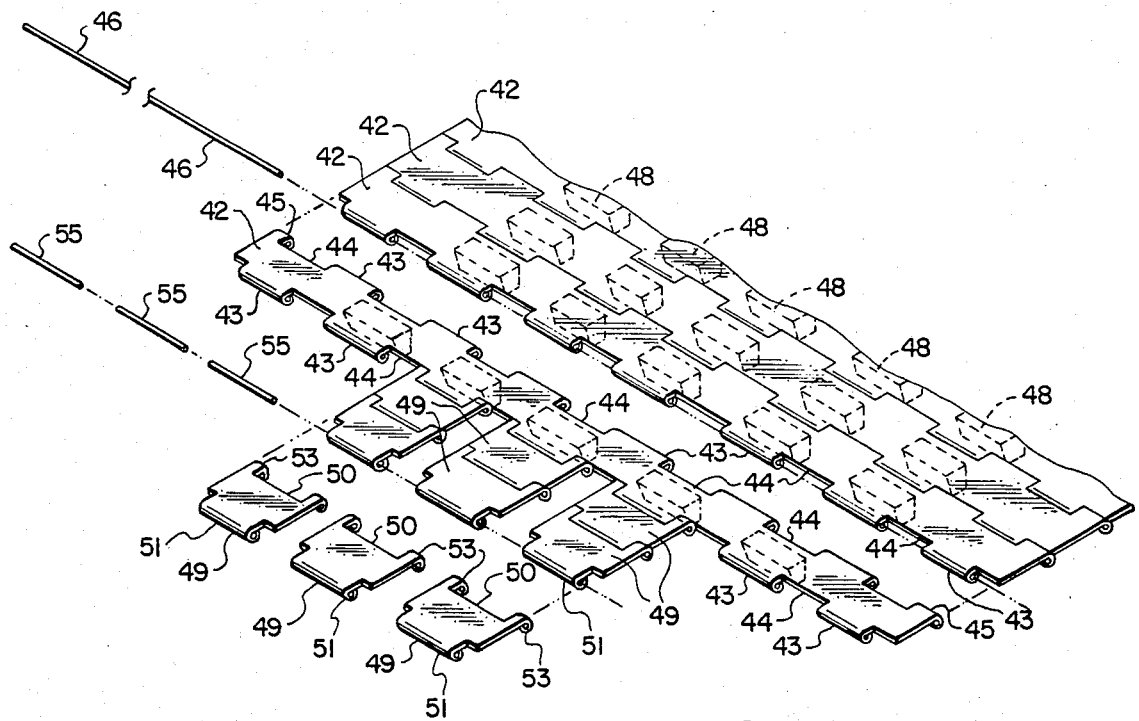
FIG. 7 is a detail exploded perspective view of some of the hinged floor plates.

Referring now primarily to FIGS. 4, 5, 7 and 8, the movable floor 40 is made up of a series of hinged metal floor plates, each generally designated by the numeral 42, which are formed with spaced apart portions 43 and 45, FIG. 7, which have been bent into a generally tubular configuration to form hinge bearings. Interposed between the hinge bearings 43 and 45 are recesses 44 for receiving complementary hinge bearings 43 formed on the opposite longitudinal side of an adjacent plate 42. The plates 42 are interconnected by elongated hinge pins 46, one shown in FIG. 7, which extend through the hinge bearings 43 and 45 to interconnect adjacent plates for hinged or pivotal movement with respect to each other.

Figure 6:
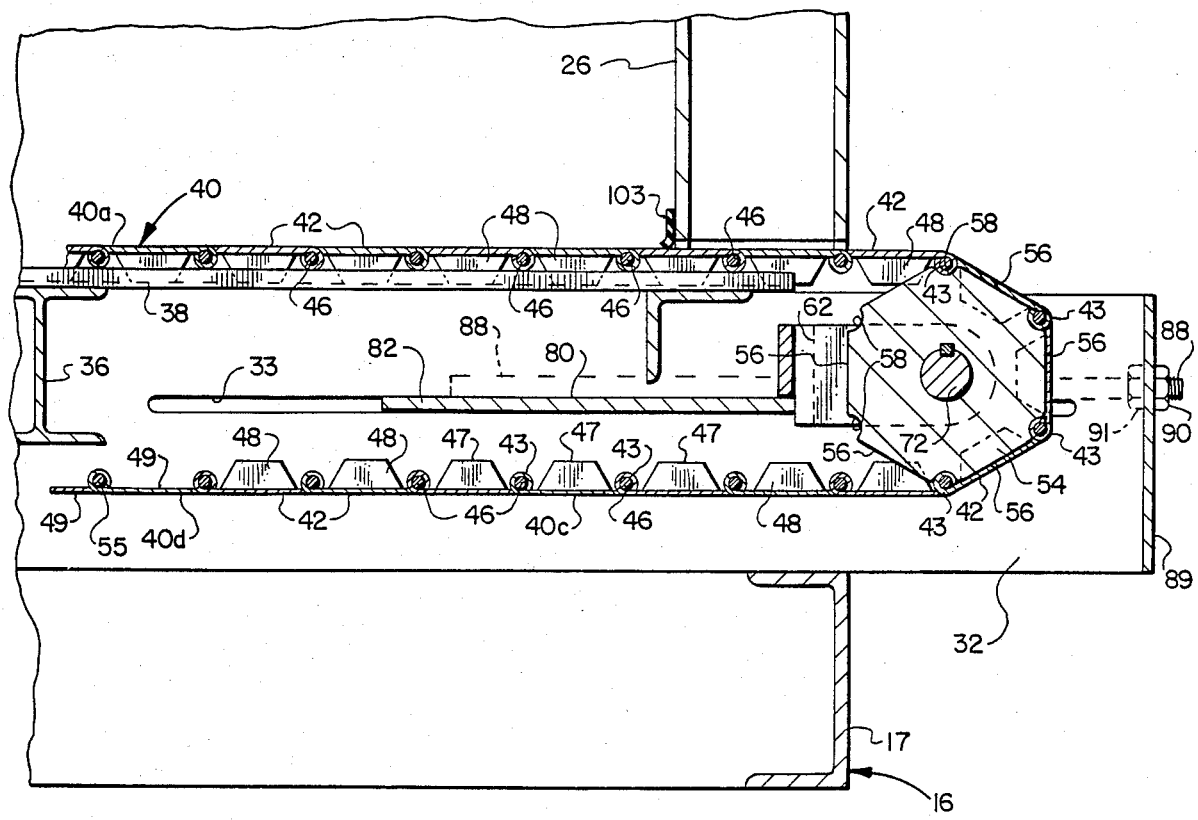
FIG. 6 is a detail section view taken along the line 6—6 of FIG. 4.
Figure 8:
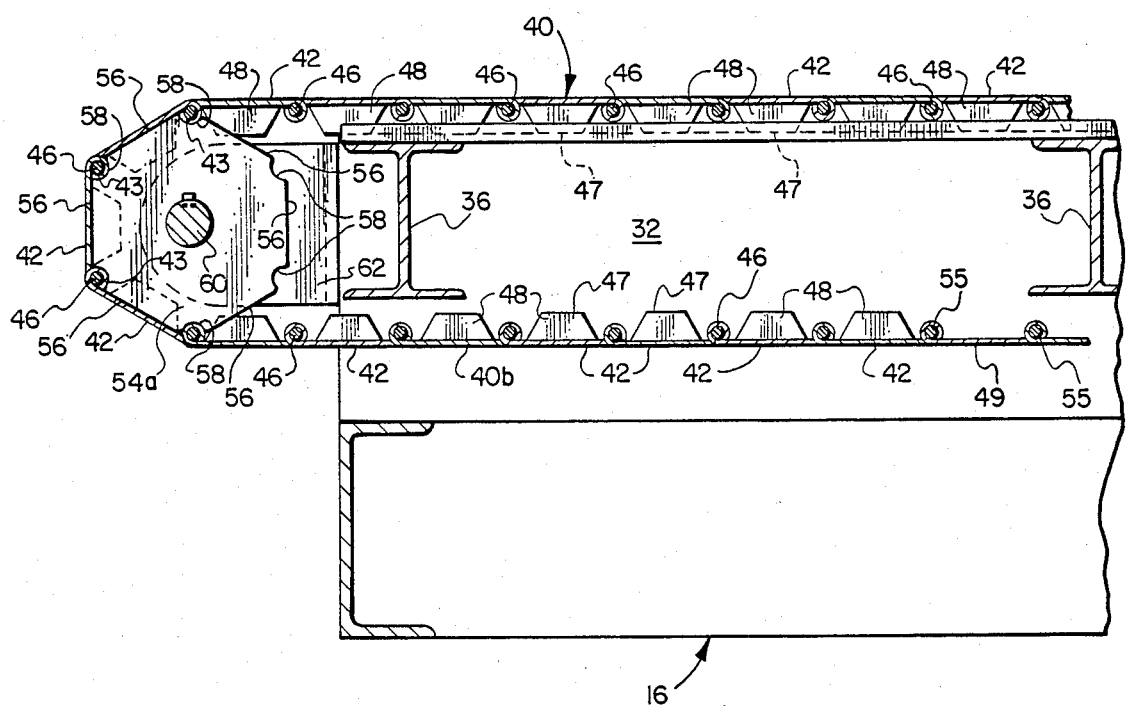
FIG. 8 is a detail section view taken along the line 8—8 of FIG. 6.

Each of the plates 42 is also provided with a plurality of spaced apart bearing shoes 48 having a somewhat trapezoidal cross-sectional shape and adapted to fit between the opposed flanges of the channel shaped bearing rails 38. The bottom surfaces 47 of the shoes 48, FIGS. 6 and 8, are adapted to slide along the web portion of the bearing rails 38. The bearing shoes 48 are preferably formed of steel or aluminum or another suitable bearing metal and are secured to the plates 42 by conventional means such as welding or threaded fasteners. Each plate 42 is provided with five bearing shoes 48 corresponding to the number of bearing rails 38.

The floor 40 is formed as a continuous endless conveyor which is trained over spaced apart sprocket assemblies at opposite ends of the frame 16 or, preferably, the floor is long enough to extend over the opposed sprocket assemblies at each end of the frame when the floor is positioned to extend the length of the cargo box and is connected along its lower run by a series of interconnected shortened plate sections 49, FIG. 7. The plates 49 are of the same general configuration as the plates 42 and have recessed portions 50 which are adapted to receive the hinge bearing portions 43 of the plates 42. The plates 49 are provided with hinge bearings 51 and 53 whereby the plates 49 may be interconnected to each other and to the plates 42 by suitable hinge pins 55, as shown in FIG. 7. The plates 49 are preferably not provided with the bearing shoes 48 as they are not required to carry a cargo load bearing directly thereon.

Referring briefly to FIG. 5, the configuration of the floor 40, which is preferred in accordance with the present invention, is such that a series of full width plates 42 are formed of sufficient length to extend around the aforementioned sprocket assemblies at each end of the frame 16, and which will be described in further detail herein, such that when the floor is in the position to carry a load the upper run of the floor 40a extends the full length of the trailer 10. The floor 40 also extends around the sprocket assemblies at each end of the frame 16 and forms relatively short full width floor sections 40b and 40c of approximately equal length when the floor is positioned as indicated in FIG. 5. The remaining lower run of the conveyor formed by the floor 40 is provided by the interconnected plates 49, three series of which are shown somewhat schematically in FIG. 5 and indicated by the numeral 40d. In this way the weight of the floor is reduced with regard to the section which is not required to support a load.

The full width sections 40b and 40c also assure that there is sufficient full width floor during a loading and unloading operation that cargo is not lost or allowed to drop through the frame 16, particularly during an unloading operation and when hauling bulk materials. The provision of the shortened plate sections 49 permits access to the underside of the floor run 40a when the floor is in the positioned indicated in FIG. 5 to permit, for example, access to the bearing rails 38 to lubricate the bearing contact surfaces. Mbreover, the arrangement of the floor also permits access to the underside of the run 40a to facilitate inspection of the floor plates 42 and the bearing shoes 48.

The flexible conveyor floor 40 provided by the interconnected floor plates 42 is trained over a drive sprocket and shaft assembly at the aft end of the trailer, and generally designated by the numeral 52 in FIG. 4. The sprocket and shaft assembly 52 includes a set of spaced apart hexagonal shaped sprockets 54 having flat sides 56 interposed between recesses 58 for drivingly engaging plates 42 and 49. As shown in FIG. 8 also, the recesses 58 in effect define sprocket teeth for receiving the hinge bearings 43, 45 and 51. Each of the sprocket members 54 is keyed to a drive shaft 60 which is supported on spaced apart pillow block bearings 62 which are each suitably secured to the frame 16 at the ends of the channel members 32 and 34. The shaft 60 is drivenly connected to a motor and speed reduction unit, generally designated by the numeral 66. The motor and speed reduction unit 66 may be of a conventional type including a hydraulic motor and gear or other power transmission means drivingly interconnecting the motor to the shaft 60.

Referring now to FIGS. 4 and 6, an idler shaft and sprocket assembly 71 is disposed at the opposite end of the frame 16 and also includes a plurality of spaced apart sprocket members 54 supported on an idler shaft 72. The sprocket members 54 are spaced apart on both of the shafts 60 and 72 sufficiently to provide clearance for the shoes 48 between the sprockets. The shaft 72 is supported in spaced apart pillow block type bearings 62 which are each secured to a movable support plate 80. The support plate 80 includes a web portion 82 which is disposed in a slot 33 formed in each of the opposing channel members 32 and 34. The plate 80 is provided with two spaced apart elongated tie rods 88, FIGS. 4 and 6, which are threaded at their distal ends, extend through a transverse frame member 89 extending between the channel members 32 and 34. The rods 88 are secured to the frame member 89 by tension adjusting nuts 90 and lock nuts 91, respectively, as shown by way of example in FIG. 6. Accordingly, the tension in the conveyor floor 40 may be adjusted by longitudinally adjusting the position of the support plate 80 for the idler sprocket assembly by tightening or loosening the nuts 90 and 91 to adjust the position of the plate and the tie rods 88.

The improved movable floor 40 is particularly advantageous for supporting loads of various types on a transport vehicle. The spaced apart bearing shoes 48 provide adequate support for each of the floor plates 42 without creating excessive friction between the floor and the bearing support rails 38. The sprocket members 54 are adapted to drivingly engage each of the plates 42 through the hinge bearing portions 43 at selected positions with respect to the longitudinal extent of the plates so as to not interfere with the bearing shoes 48. This arrangement is advantageous in that the sprockets 54 drivingly engage the respective floor plates themselves and the floor assembly does not require separate driving linkage such as roller chains or cables and lugs. The floor plates 42 are directly connected to each other and are not subject to longitudinal movement relative to each other such as occurs with floor plates which are interconnected by cable or chain driving means. Accordingly, leakage of bulk material and the like is less likely to occur with the closely spaced and interconnected floor plates.

At least two of the sprockets 54 are positioned so as to drivingly engage the plates 49 when these plates traverse over the sprockets. In this regard the two inboard sprockets 54a, are preferably positioned on the shafts 60 and 72 so that they engage the hinge bearing portion 53 of adjacent plates 49 making up the runs 40d.

Referring briefly to FIG. 3, the trailer 10 is further modified to minimize the leakage of bulk material around the longitudinal edges of the floor 40 by the provision of longitudinal coamings 100, one shown, which extend along the lower edges of the inner sides of the opposed sidewalls 22 and 24. As shown by way of example, the coamings 100 are characterized by elongated plate members which are secured to the sidewalls and supported on and above a member formed from an angle section 104. The coamings 100 and the members 104 are positioned just above the upper surface of the floor plates 42 with minimal clearance therebetween to minimize leakage flow of bulk material between the longitudinal side edges of the floor 40 and the trailer sidewalls 22 and 24. Moreover, by spacing the bearing rails 38 inboard of the edges of the floor 40 any leakage flow which does fall between the longitudinal edges of the floor and the angle section 104 will drop to the ground and will not be lodged on one of the bearing plates. The front wall 26 is also provided with a flexible seal strip 103 along the lower edge thereof as shown in FIG. 6.

The operation of the movable floor 40 is believed to be readily understandable from the foregoing description. However, briefly, in unloading the trailer 10, for example, the motor 66 may be operated to traverse the floor 40 to move in the direction of the arrow 105 in FIG. 1 until the load supported on the run 40a is moved to the rear of the trailer as far as possible while some floor surface remains available for initial loading operations. Bulk material and/or containerized material may then be placed on the portion of the floor 40 remaining disposed between the walls 22 and 24, and the floor may then be progressively moved in the direction opposite the arrow 105 as additional cargo is loaded onto the floor. The floor 40 may be traversed in either direction since the opposite ends of the floor represented by the conveyor runs 40b and 40c are interconnected by the plates 49 forming the runs 40d. Alternatively, of course, the floor may be an endless conveyor structure formed entirely of interconnected floor plates 42.

The frame 16 and the structure associated therewith may be adapted to be used with various types of cargo bodies and trailers such as open bed bulk material bodies and the like. Those skilled in the art of movable floor haulage vehicles will recognize that various substitutions and modifications may be made to the specific embodiment described herein without departing from the scope and spirit of the invention as recited in the appended claims.

What I claim is:
1. A self unloading vehicle bed comprising:
a frame adapted to be supported by an undercarriage;

a movable load supporting floor supported on said frame, said floor including a load support portion comprising a plurality of floor plate members extending the full transverse length of said load support portion, said floor plate members each including bearing means engageable with cooperating bearing means on said frame and hinge bearing portions for receiving elongated hinge pins for interconnecting said floor plate members with each other seriatim;

a drive shaft disposed on said frame at one end thereof and an idler shaft disposed on said frame at the opposite end thereof, said drive shaft and said idler shaft each supporting spaced apart sprockets thereon, said sprockets each having a polygonal cross section and circumferentially spaced apart recesses formed on the periphery of said sprockets for driving engagement with said hinge bearing portions of said floor plate members, respectively;

said load support portion of said floor extending at least between both of said sprockets in the normal full load bearing position of said floor to form an upper run of said floor, and said floor including a plurality of connecting plate members extending between opposite ends of said load support portion and being interconnected to said load support portion and to each other to form a lower run of said floor, said connecting plate members being of a configuration corresponding to said floor plate members and of a transverse length substantially less than said floor plate members, said connecting plate members being interconnected by complementary hinge bearing portions drivably engageable with at least one of said drive and idler sprockets, respectively; and means for rotating said drive shaft to traverse said upper run comprising said load support portion of said floor and said connecting plate members comprising said lower run in opposite directions over said drive and idler sprockets, respectively, for traversing said load support portion along said upper run during loading and unloading operations and to provide for access to said bearing means on said frame between said sprockets along said upper run, and to provide access to said bearing means on said floor plate members.

2. A self unloading vehicle bed comprising:

a frame adapted to be supported by an undercarriage;

a movable load supporting floor supported on said frame, said floor including a load support portion comprising a plurality of floor plate members extending the full transverse length of said load support portion, said floor plate members each including a plurality of spaced apart bearing blocks engageable with cooperating bearings on said frame formed by longitudinally extending parallel channel shaped bearing rails, and said floor plate members include hinge bearing portions for receiving elongated hinge pins for interconnecting said floor plate members with each other seriatim;

a drive shaft disposed on said frame at one end thereof and an idler shaft disposed on said frame at the opposite end thereof, said drive shaft and said idler shaft each supporting spaced apart sprockets thereon, said sprockets each having a polygonal cross section and circumferentially spaced apart recesses formed on the periphery of said sprockets for driving engagement with said hinge bearing portions of said floor plate members, respectively;

said load support portion of said floor extending at least between both of said sprockets in the normal full load bearing position of said floor to form an upper run of said floor, and said floor including a plurality of connecting plate members extending between opposite ends of said load support portion and being interconnected to said load support portion and to each other to form a lower run of said floor, said connecting plate members being of a transverse length substantially less than said floor plate members of said load support portion, said connecting plate members being interconnected by complementary hinge bearing portions drivably engageable with at least one of said drive and idler sprockets, respectively; and means for rotating said drive shaft to traverse said upper run comprising said load support portion of said floor and said connecting plate members comprising said lower run in opposite directions over said drive and idler sprockets, respectively, for traversing said load support portions along said upper run during loading and unloading operations and to provide for access to said bearing rails on said frame between said sprockets along said upper run, and to provide access to said bearing blocks on said floor plate members.

3. A self unloading vehicle bed comprising:

a frame adapted to be supported by an undercarriage;

a movable load supporting floor supported on said frame, said floor including a load support portion comprising a plurality of floor plate members extending the full transverse length of said load support portion, said floor plate members each including bearing means engageable with cooperating bearing means on said frame and hinge bearing portions for receiving elongated hinge pins for interconnecting said floor plate members with each other seriatim;

a drive shaft disposed on said frame at one end thereof and an idler shaft disposed on said frame at the opposite end thereof, said drive shaft and said idler shaft each supporting spaced apart sprockets thereon, said sprockets each having a polygonal cross section and circumferentially spaced apart recesses formed on the periphery of said sprockets for driving engagement with said hinge bearing portions of said floor plate members, respectively;

said load support portion of said floor extending at least between both of said sprockets in the normal full load bearing position of said floor to form an upper run of said floor, and said floor including a plurality of connecting plate members extending between opposite ends of said load support portion and being interconnected to said load support portion and to each other to form a lower run of said floor;

one of said drive shaft and said idler shaft being mounted on a plate supported on said frame for limited movement to adjust the distance between said shafts for tensioning said runs of said floor;

said connecting plate members being of a transverse length substantially less than said floor plate members of said load support portion, said connecting plate members being interconnected by complementary hinge bearing portions drivably engageable with at least one of said drive and idler sprockets, respectively; and means for rotating said drive shaft to traverse said upper run comprising said load support portions of said floor and said connecting plate members comprising said lower run in opposite directions over said drive and idler sprockets, respectively, for traveling said load support portion along said upper run during loading and unloading operations and to provide for access to said bearing means on said frame between said sprockets along said upper run, and to provide access to said bearing means on said floor plate members.

* * * * *